(12) United States Patent
Diziol et al.

(10) Patent No.: US 12,423,198 B2
(45) Date of Patent: Sep. 23, 2025

(54) DATA PROCESSING NETWORK FOR PERFORMING RELIABLE DATA PROCESSING

(71) Applicant: Robert Bosch GmbH, Stuttgart (DE)

(72) Inventors: Raphael Diziol, Kandel (DE); Stefan Egenter, Freiburg (DE); Michael Poehnl, Wurmberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/701,556

(22) PCT Filed: Sep. 28, 2022

(86) PCT No.: PCT/EP2022/076912
§ 371 (c)(1),
(2) Date: May 22, 2024

(87) PCT Pub. No.: WO2023/066625
PCT Pub. Date: Apr. 27, 2023

(65) Prior Publication Data
US 2025/0068526 A1    Feb. 27, 2025

(30) Foreign Application Priority Data
Oct. 18, 2021    (DE) .................. 10 2021 211 712.0

(51) Int. Cl.
G06F 11/16 (2006.01)
(52) U.S. Cl.
CPC .... G06F 11/1641 (2013.01); *G06F 2201/845* (2013.01)
(58) Field of Classification Search
CPC .............. G06F 11/1641; G06F 2201/845
See application file for complete search history.

(56) References Cited

U.S. PATENT DOCUMENTS 5,838,894 A * 11/1998 Horst ............... H04L 49/90
709/239
7,320,091 B2 * 1/2008 Blaauw .............. G06F 11/1695
714/708

(Continued)

FOREIGN PATENT DOCUMENTS

DE    10 2015 218 882 A1    3/2017
EP      3 588 309 A2         1/2020

OTHER PUBLICATIONS

T. Kottke and A. Steininger, "A Reconfigurable Generic Dual-Core Architecture," International Conference on Dependable Systems and Networks (DSN'06), Philadelphia, PA, USA, 2006, pp. 45-54 (Year: 2006).*

(Continued)

*Primary Examiner* — Matthew M Kim
*Assistant Examiner* — Indranil Chowdhury
(74) *Attorney, Agent, or Firm* — Maginot, Moore & Beck LLP

(57) ABSTRACT

A data processing network is for performing a plurality of successive data processing steps in a redundant and validated manner. The data processing steps are each used to generate output data from input data. At least some output data from a first data processing step are at the same time input data of a further data processing step. At least a first data processing module and a second data processing module are provided for performing each data processing step. The data processing network includes a comparator module. The first data processing module and the second data processing module are configured to perform the data processing steps, optionally in a first working mode with parallel operation, or in a second working mode with an upstream data processing module and a downstream data processing module.

14 Claims, 4 Drawing Sheets

(56) References Cited

U.S. PATENT DOCUMENTS

| | | | | |
|---|---|---|---|---|
| 8,060,814 B2* | 11/2011 | Blaauw | ............... | G06F 11/0721 |
| | | | | 714/814 |
| 2009/0193229 A1* | 7/2009 | Aegerter | ............. | G06F 11/1687 |
| | | | | 712/30 |
| 2012/0304024 A1* | 11/2012 | Rohleder | .................. | G06F 9/38 |
| | | | | 714/49 |
| 2016/0283314 A1 | 9/2016 | Thanner et al. | | |
| 2020/0034262 A1* | 1/2020 | Bemanian | ........... | G06F 11/2242 |

OTHER PUBLICATIONS

International Search Report corresponding to PCT Application No. PCT/EP2022/076912, mailed Jan. 25, 2023 (German and English language document) (6 pages).

* cited by examiner

DATA PROCESSING NETWORK FOR PERFORMING RELIABLE DATA PROCESSING

This application is a 35 U.S.C. § 371 National Stage Application of PCT/EP2022/076912, filed on Sep. 28, 2022, which claims the benefit of priority to Serial No. DE 10 2021 211 712.0, filed on Oct. 18, 2021 in Germany, the disclosures of which are incorporated herein by reference in their entirety.

BACKGROUND

Systems for driver assistance or for automated driving are comprised of many individual software units, which, with respect to data flow, can typically be described using graphs. These software units (often also called runnables, nodes, or data processing components) are characterized by an amount of input data being processed and an amount of output data being generated therefrom.

In the aforementioned systems, input data from sensors, such as radar or video, is processed in a graph of data processing components that visualizes the data flow in a static view.

The various software units regularly form a complex data processing network with which sensor data is processed to perform actions based on the sensor data. For example, such actions can be control tasks in the context of an autonomous driving operation of a vehicle. The data processing in the data processing network typically includes a plurality of interdependent data processing steps or data processing tasks performed using the data processing components.

As part of the functional safety requirements of driver assistance systems and (highly) automated driving (HAD), the likelihood of systematic and sporadic hardware failures must not exceed a predetermined frequency that is a function of the risk and the expected damage of the system functions. Because newly developed driver assistance systems are regularly used in parallel to one another in a large variety of vehicles, and since the risk must be evaluated relative to the entire vehicle fleet equipped accordingly, the acceptable probability of hardware failures occurring is extremely low.

Compared to today's high-end processors, the computing power of commonly available microcontrollers meeting these safety levels is very limited. Their maximum clock speed is approximately 10% (300 MHz vs. 3 GHz) and they lack internal optimizers, which are standard in off-the-shelf microprocessors (µP), and which take up a large proportion of their performance.

Proceeding from this, a novel approach to building a data processing network for a motor vehicle is to be described, the approach addressing a solution for the limited computing powers of conventionally available microcontrollers for these kinds of safety levels while at the same time making possible an extensive realization of the performance advantages of today's high-end processors.

DISCLOSURE OF THE INVENTION

Described herein is a data processing network for performing a plurality of successive data processing steps in a redundant and validated manner, said data processing steps each being used to generate output data from input data, wherein at least some output data from a first data processing step are at the same time input data of a further data processing step wherein at least a first data processing module and a second data processing module are provided for performing each data processing step, wherein the data processing network further comprises a comparator module, wherein the first data processing modules and the second data processing modules are configured to perform data processing steps, optionally in a first working mode with parallel operation or in a second working mode with an upstream data processing module and a downstream data processing module, wherein in the first working mode with parallel operation, control parameters of the individual data processing steps are transmitted to the comparator module and the comparator module is configured to perform at least one comparison of corresponding control parameters that were transmitted by the first data processing modules and the second data processing modules, and to provide at least one synchronized control parameter based on this comparison, the control parameter containing control information regarding at least one performed data processing step, and wherein, in the second working mode, with a upstream data processing module and a downstream data processing module, a sequence of successive data processing steps is performed in the upstream data processing module without transmitting the control parameters between the data processing steps to the comparator module and comparing them there for verification, wherein after performing the sequence of successive data processing steps, control parameters are transmitted to the comparator module, causing a recalculation of the sequence of data processing steps in the downstream data processing module.

In the data processing network described, it is made possible to realize a hardware-based software lockstep that meets the corresponding requirements (for example ASIL-D conformity). This is the case in particular for data processing networks in which the data processing requires high computing power which usually requires very high-performance hardware.

The basic approach is that the first data processing module and the second data processing module each use separate hardware (cores separated from one another) that have a high computing power and both perform the same calculation. The comparator module compares the calculations, the comparator module only being used for further data processing in the data processing network if the calculation result is the same. Sameness is monitored by the data processing module using the control parameters and the synchronized control parameter is used in the data processing network to control the control flow of the data processing.

The points at which the first data processing module and the second data processing module provide the control parameters, in order to then forward them to the comparator module, are also normally referred to as synchronization points.

The method described here relates to a so-called software lockstep as already explained. A software lockstep is to be distinguished from a hardware lockstep. A hardware lockstep requires significantly more complex hardware.

The hardware lockstep, which is not claimed herein, is normally implemented in a way that each calculation step of the software program being operated on the hardware used is performed twice by the hardware. This means that the software program itself only runs once on the hardware. An operating system only sees one instance of the respective software program. The hardware executes each step of the software twice under the one operating system level.

In contrast, the software lockstep described here means that the program is run twice, at the operating system level. If necessary, two independent operating systems (a first operating system on the first data processing module having a first hardware/core and a second operating system on the second data processing module having a second hardware/core) can also be operated, each performing their respective data processing steps (and thereby twice), respectively.

A software lockstep can also be operated on an operating system, wherein the instruction is, if necessary, given at the level of the operating system to use different hardware (two different cores) for the duplicate execution.

Once there are two instances that are replicatable/duplicatable without hardware modification, duplicate execution is then called a software lockstep. A hardware lockstep always means that additional hardware (circuits, transistors, etc. must be necessary), established below the operating system level and that are not discernible as being separate from one another for the operating system, but rather appear as a single hardware from the perspective of the operating system. Thus, when using a hardware lockstep, at least twice the number of transistors is always required to achieve the same performance as without a hardware lockstep.

Through the described data processing network or with the described data processing network, a lockstep approach is also possible on controllers/processors that were not specifically designed for this purpose.

However, the normal case is that the first data processing module and the second data processing module are performed with identical software and identical hardware (identical cores) as far as their specification is concerned. As long as the respective data processing module or the underlying hardware functions correctly, the same input data in both data processing modules also produces the same output data.

If a software lockstep is used for real-time (near-range) applications, many known architectures are based on time slice grids in which the processing of the computing steps may never exceed the predetermined framework. In this context, the so-called WCET (WCET=Worst Case Execution Time) is often referred to. In this respect, the computing steps to be executed in the time slices, and in what order, are established a priori. Since the computing steps are known in advance, the two units used can perform the processing steps in parallel. Often, there is a high variability in the amount of computational effort required for processing the input data to generate output data. An example is an image analysis for determining all visible traffic signs. For example, a data processing step for performing such an analysis requires a much longer time when a hundred traffic signs are visible at the same time than when only two traffic signs are in the visible area. In a common software lockstep approach, time slices would need to be designed, using a WCET, such that sufficient time to perform the data processing step is always provided for all conceivable relevant cases.

By comparison, data-driven systems are more flexible, but the order of execution can depend on the outcome and duration of the previous calculations. The order of the computing steps is then no longer known a priori. For a SW lockstep, this property means that possible branch points must always also be synchronization points. When using the computing units in parallel, the result of a computing step must always be validated first before the next step can be safely determined and performed.

Therefore, it can be more efficient for data-driven architectures to not calculate in parallel, but rather to run a computing unit (in advance of synchronization) and to calculate and verify the achieved result on the other units- specifying the identical order of execution. This provides in this case a primary module that specifies the calculation on the subordinate secondary modules.

Today's hardware lockstep-enabled microcontrollers do not meet the computing power requirements as required for highly automated driving; at the same time, current high performance processors do not meet the required ASIL-D safety ratings.

In order to nevertheless obtain a computing system for highly automated driving, one must find a way to secure the fast but unsafe processors in a corresponding way. A software lockstep is proposed for this purpose.

The simplest way to attempt to do this would be to implement the software lockstep on a corresponding microprocessor. However, this would not only halve its computing power (at least) but would also have two serious problems: on the one hand, systematic errors in redundant computing on identical hardware could not be ruled out, and on the other hand a necessary comparator for comparing the output data/calculation results would also be running on the unsafe hardware, which is why the results could not be sufficiently trusted.

To solve this problem, it is proposed here to implement a software lockstep based on at least two modules having separate hardware and a comparator unit (comparator module), wherein the comparator unit/module runs on additional ASIL-D compliant hardware.

Given that in the approaches described above, when adhering to a WCET the maximum required computing time must be reserved but that this is typically only required in exceptional cases, in most steps there is time "left over" which along the processing chain of the system amounts to an unacceptable latency and to a worse utilization of the hardware. Thus, the risk with a parallel software lockstep having an order of execution that is determined a priori while using WCET is that the required maximum latency cannot be reached or can fall below in the overall system.

A significantly better use could be achieved with a data-driven architecture as can be constructed further as above, for example with a primary module and downstream-computing secondary modules. In such an architecture, the respective next data processing step is performed ad hoc, wherein the exact procedure does not have to be known a priori, and this results in a high flexibility.

Such architecture, however, has drawbacks, in particular for the automotive applications described here, which are to be briefly explained below:

The order of execution is predetermined by the primary module. The dependent secondary modules perform downstream calculations "blindly" to a certain degree. Therefore, the order of execution can only be checked—if at all—using invariants or general rules. This results in the same safety rating for the control flow as for the respective hardware used in each case. A high ASIL-D level is not achievable with such architectures. In other words: Although it can be subsequently determined, by recalculating using the secondary modules, that the calculations in the primary module could have been incorrect—but then it is already too late because the results of the calculations would have already been previously required.

It is always the case that the comparison of the calculations can only take place after the redundant computing step and the following result communication has taken place. The time until an error occurs in the calculation has basically doubled. This results in increased error latency, possibly also an unnecessary latency in the regular procedure.

That is to say, although known approaches of a lockstep with a primary module and secondary module(s) allow for a more flexible and data-driven execution, they also have the problem of increased latency.

The proposed data processing network, and data processing methods implemented by it, enable satisfactory performance for highly autonomous driving. The proposed data processing network makes combined time-driven and data-driven architecture possible. That is to say, a flexible order of execution in the software lockstep is possible in comparison to batches with an order of execution determined a priori.

To this end, a software lockstep approach performed in parallel but not based on time slices is selected that is implemented on at least two microprocessors (the first data processing module and the second data processing module) as computing units and a control component running on an additional, trusted hardware (the comparator module).

This control unit, which meets the safety target standard, synchronizes the procedure on the computing units and compares their results.

Compared to the primary/secondary module lockstep, the redundant calculation steps are processed (quasi) simultaneously, thus not producing a cascade and thereby resulting in a better latency behavior (see FIG. 3).
Instead of transmitting the complete data packets to the comparator, it is also possible to transmit only the checksums of the data (packets) as control parameters from the data processing modules to the comparator module in the data processing network described here, which may significantly reduce the communication load.

These optimizations and the mixed, i.e., data and time-driven, operation achieve a good and efficient utilization of the hardware.

From a safety architecture perspective, the design of the data processing network described corresponds to the decomposition of a safety-critical task. For the individual computing units, this results in a reduced ASIL requirement, so that an ASIL-D rating of the overall system can be achieved even with today's high-performance processors.

In order to be able to use the data processing network described to run software, the following prerequisites exist:
all data and all relevant control events are depicted on a timeline or equivalent structure, such as an event queue. The timeline may also be referred to as the "Common Logical Timeline".
each calculation step initiated by a control event is data deterministic. That is to say, with the same start state, identical input data also always lead to the same output data.

The essential feature of the method described herein is that it is possible to selectively switch between the first working mode in parallel operation or the second working mode with the upstream data processing module and the downstream data processing module (the switching depending on the requirements for the certainty of the respective calculations in a single data processing step or a particular (partial) sequence of data processing steps).

According to the lockstep approach described, during the second working mode the first working mode corresponds to the working mode described further above which includes an upstream primary module and dependent downstream secondary modules. In this working mode, an especially high performance can temporarily be achieved because the upstream data processing module can operate substantially unaffected by the second data processing module and the comparator module, similar to a conventional high-performance hardware. The special feature of the data processing network described here is that this performance advantage can be used temporarily and that at the same time the design that includes two parallel computing data processing modules and a comparator module is present as a higher-level structure, such that the desired high ASIL levels can be achieved, in particular for safety-critical aspects.

In this context, it is particularly advantageous if the data processing network comprises a scheduling recorder that, when operated in accordance with the second working mode, is configured to record sequence data relating to the sequence of successive data processing steps and to provide the downstream data processing module for recalculating the sequence of data processing steps.

The reason for introducing the scheduling recorder is the recognition that the order of execution of the individual data processing steps within a sequence can be variable depending on data being processed or being created during data processing. In order to enable error-free recalculation of the data processing steps, it is necessary for this reason to record this order as sequence data for recalculation in the downstream data processing module.

Preferably, the data processing network is configured for switching between the first working mode and the second working mode depending on the situation (as required). In embodiment variants, for certain data processing steps within the data processing network, it is determined whether to process them according to the first working mode or according to the second working mode. However, it is also possible to select variants in which a specific type of data processing can be selected for certain data processing steps depending on the situation (for example as a function of a present operating situation/driving situation of a motor vehicle in/for which the described method is operated).

It is particularly advantageous if the comparison of the control parameters comprises an identity check and a synchronized control parameter requires an identity of the control parameters from the first data processing module and from the second data processing module.

In addition, if the data processing network is configured to use synchronized control parameters provided by the comparator module, it is advantageous to control further data processing of the output data using further data processing steps of the data processing network.

Moreover, it is advantageous if the synchronized control parameter is a validity parameter that includes validity information regarding at least one performed data processing step.

In addition, it is advantageous if the data processing network comprises at least one sequentialization module, each of which is configured to sort and synchronize control parameters from the data processing modules and/or from the data processing steps and then pass them on sorted to the comparator module so that the comparator module can determine synchronized control parameters independent of the order in which the data processing modules had executed the data processing steps.

The sequentialization module serves in particular to reconstruct the order in which the data processing steps were completed in the individual data processing modules, and in particular on the available hardware, respectively. An availability of the hardware to perform further data processing tasks can be determined in this way. The sequentialization module is assigned to the respective data processing module, and it transmits the control parameter to the comparator module or to the (third) hardware component on which the comparator module is being operated.

In addition, it is preferable for there to be a synchronizer that synchronizes respective mutually-associated control parameters of the two data processing modules (i.e. parameters that exactly correspond to one another as long as no error has occurred) with one another and, if necessary, forms control parameter tuples that are supplied to the comparator module. Preferably, the synchronizer and comparator module together form a central processing unit that operates on a (third) hardware component. The synchronizer achieves flexibility in the order in which the data processing steps are executed. The hardware of the respective data processing module can also be used (after the hardware has finished performing a data processing step) to perform further data processing steps.

Because the same data processing step is performed on the first data processing module and on the second data processing module, the same control events and data events are generated on each module as is generated on the other module upon successful completion, but these events can be generated in a different order due to the parallel processing on the units.

The central processing unit (consisting of comparator module and synchronizer) now caches events (control parameters) until the right event (the corresponding control parameter) has arrived from all data processing modules. The related control parameters can then be compared and evaluated once determined as being the same, and the synchronized control parameter can then be output.

Preferably, there is also a task distribution module which then, once synchronized control parameters from the hardware module are present, schedules and commissions the start of the individual (next) data processing steps on the respective hardware so that a particularly good utilization of the hardware can be achieved.

Preferably, the task distribution module places a type of stimulus on the individual data processing modules to activate them. By using the central processing unit or the third hardware component and the comparator module, there is indeed a slight increase in the latency between the execution of two data processing tasks. Overall, however, this increase in latency is acceptable, in particular in comparison with common primary/secondary module architectures.

In the event that the central processing unit or the synchronizer and the sequentialization modules and the comparator module cannot determine a clear order of the received control parameters/events, an error case can be determined. Depending on the use case, this may result in another recalculation or termination of the data processing using the data processing network.

Stimuli are found by the central unit in a certain way. Whenever a correct calculation result has, by comparing control parameters, been determined by the comparator module and hence a synchronized control parameter has been successfully calculated, this can generate a stimulus, provided the control flow of the data processing network specifies the same. Further data processing may then be initiated by or using this stimulus, the further data processing requiring that output data calculated using the respective first data processing module and the respective second data processing module be used as input data.

In addition, time events are generated as stimuli for a time-driven execution.

The central processing unit manages the timeline (Common Logical Timeline) of the data processing to a certain extent, as already described above.

If successful, this results in all computing units having identical results, driven by data and time, despite possible differences in the local order of execution.

It is advantageous for first data processing modules to be realized with first hardware components and second data processing modules to be realized with second hardware components, wherein first hardware components and second hardware components are physically separated from each other.

It is also advantageous for at least one of the data processing modules to comprise a hardware component that is not ASIL-D compliant.

It is particularly advantageous for both hardware components of the data processing modules to be non-compliant with ASIL-D.

In addition, it is advantageous for the comparator module to be realized with third hardware components physically separated from the first hardware components and from the second hardware components.

In this regard, it is advantageous for the third hardware component to be ASIL-D compliant.

It is also advantageous if the comparator module comprises a data storage means in which determined control parameters are stored together with time information so that a logical timeline is created that depicts the order of processing the data processing steps using the data processing modules of the data processing network.

In this context, it is also advantageous if a hardware component of the data processing modules is significantly more powerful than a hardware component of the comparator module. The possible performance differences between the third hardware component of the comparator module and the (first and second) hardware components of the data processing modules depends on the respective use case of the data processing network. For example, it is common for a processor cycle of the first and second hardware components to be at least 5 times, possibly even 10 times, as large as the processor cycle of the third hardware component.

If necessary, in order to determine the communication path between the data processing modules and the central processing unit (comparator module and, if necessary, sequentialization module and task distribution module), control parameters can be calculated as their checksum (CRC) as output data for large amounts of data, and only these are sent to the comparator module together with the unique packet identification (meta-sample alias) as control parameters. The actual flow of output data of a data processing step as input data to the next data processing step can take place on the first hardware component and the second hardware component (and possibly also on other hardware components) independently of each other or in parallel to each other, wherein, if necessary, data transfer interfaces may exist between different hardware components that are also independent of the central processing unit or of the comparator module. The central processing unit or the comparator module then does not check the original data, but instead checks their checksums, for example, which leads to a bit-wise comparison of the original content. It is of note in this regard that the first hardware component and the second hardware component must intermediately buffer the original data packets until they are confirmed by the comparator and can be delivered.

Since the calculation of the checksums proposed here as control parameters for transfer to the comparator module also represents a consumption of resources which is not insignificant, it is also possible to decide, depending on the amount of output data, whether a direct comparison of the output data or a comparison of the checksums of the output data is to be carried out.

It is particularly advantageous if the comparison of the control parameters comprises a check of whether an error that has occurred during data processing in the first data processing module and/or the second data processing module is below a tolerance limit, and if so the synchronized control parameter is generated. This means, in particular, that in such cases, the synchronized control parameter can be generated, if necessary, even though an error has occurred which is nevertheless below the tolerance limit.

Also described here is a method for operating a described data processing network comprising at least the following steps:
  a) determine whether a sequence of successive data processing steps in a first working mode is to be operated with parallel operation of the first data processing module and the second data processing module or with a second working mode using an upstream data processing module and a downstream data processing module,
  b) operating the first data processing module and the second data processing module according to the first working mode or according to the second working mode to perform the data processing steps, wherein in the first working mode the following step c1) is performed after each data processing step, and wherein in the second working mode the following step c2) is performed after completion of the sequence of successive data processing steps:
    c1) performing a comparison of respective control parameters transmitted by the first data processing module and the second data processing module using a comparator module, and, based on this comparison, providing at least one synchronized control parameter that contains control information regarding at least one performed data processing step, and
    c2) recalculating the sequence of data processing steps in the downstream data processing module based on control parameters which were determined in the calculation of the sequence of data processing steps in the upstream data processing module, and performing a comparison of the calculations using the comparator module and providing at least one synchronized control parameter based on this comparison, the control parameter containing control information regarding at least one performed sequence of data processing steps.

BRIEF DESCRIPTION OF THE DRAWINGS

The data processing network described and the technical environment are explained in more detail below with reference to the figures. The figures show preferred exemplary embodiments which are not limited to the disclosure. The figures are schematic only and each illustrates individual aspects of the described data processing network. The drawings show.

DETAILED DESCRIPTION

Figure 1:
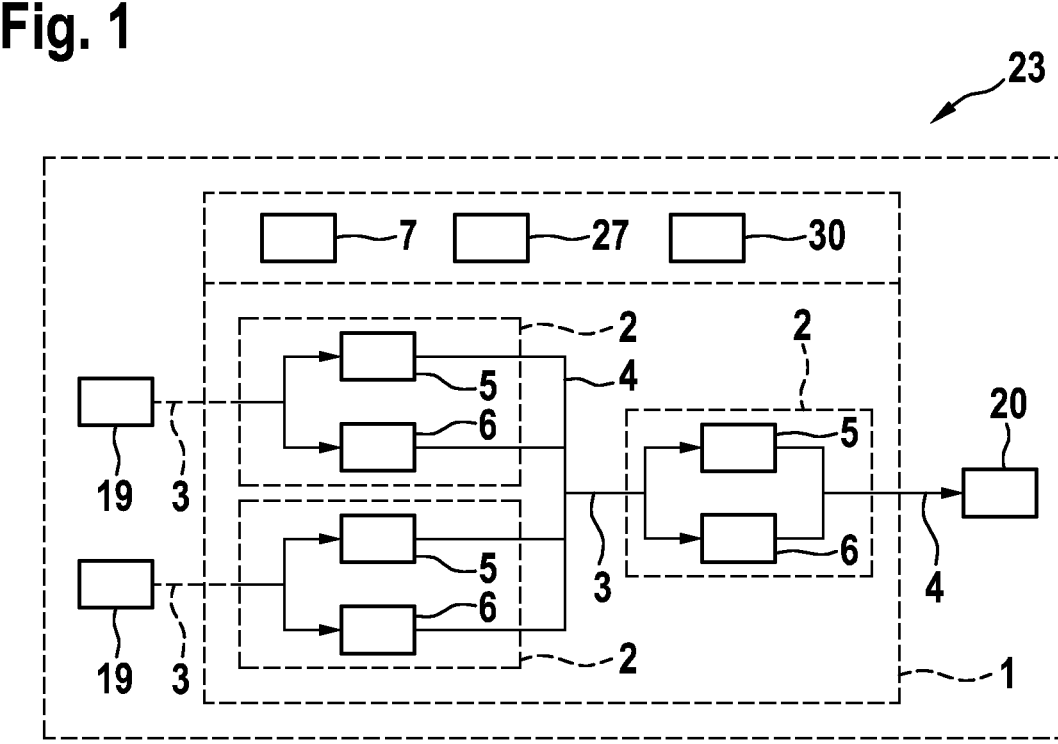
FIG. 1: a described data processing network.

FIG. 1 shows a described data processing network 1 in a motor vehicle 23. By way of example, it is shown here that the data processing network 1 serves to process data from sensors 19 and that the system supplies data to an output data receiver 20. Such an output data receiver 20 may, for example, be a system for autonomous driving operations or a similar system. For example, the data processing network 1 can serve to reduce the sensor data to decision-relevant parameters which can be the output data 4 of the data processing network 1. In the illustration in FIG. 1, the focus is on the parallel first working mode of the data processing network.

Also included in the data processing network 1 here are hardware components on which the data processing network 1 or its components and modules can be operated.

The data processing network 1 performs individual data processing steps 2 that build upon one another. Output data 4 of a data processing step 2 can be input data 3 of further data processing step 2. Here, each data processing step 2 is realized by a plurality of data processing modules 5, 6 performed as independently as possible. A first data processing module 5 and a second data processing module 6 are shown here, respectively. More than two data processing modules may also be provided that perform a data processing step 2 (in parallel).

The data processing network 1 comprises further components which will be explained in more detail with the aid of the other figures. The other components include, in particular, the comparator module 7 and, optionally, also a synchronizer 27, which are only indicated here schematically. Schematically in FIG. 1, a scheduling recorder 30 used to record a scheduling order for performing the individual data processing steps 2 is also indicated. In particular, the scheduling recorder becomes more important when the data processing network is operated in the second working mode because scheduling becomes very important for recalculating the pre-calculated sequence of data processing steps in the downstream data processing module.

Figure 2:
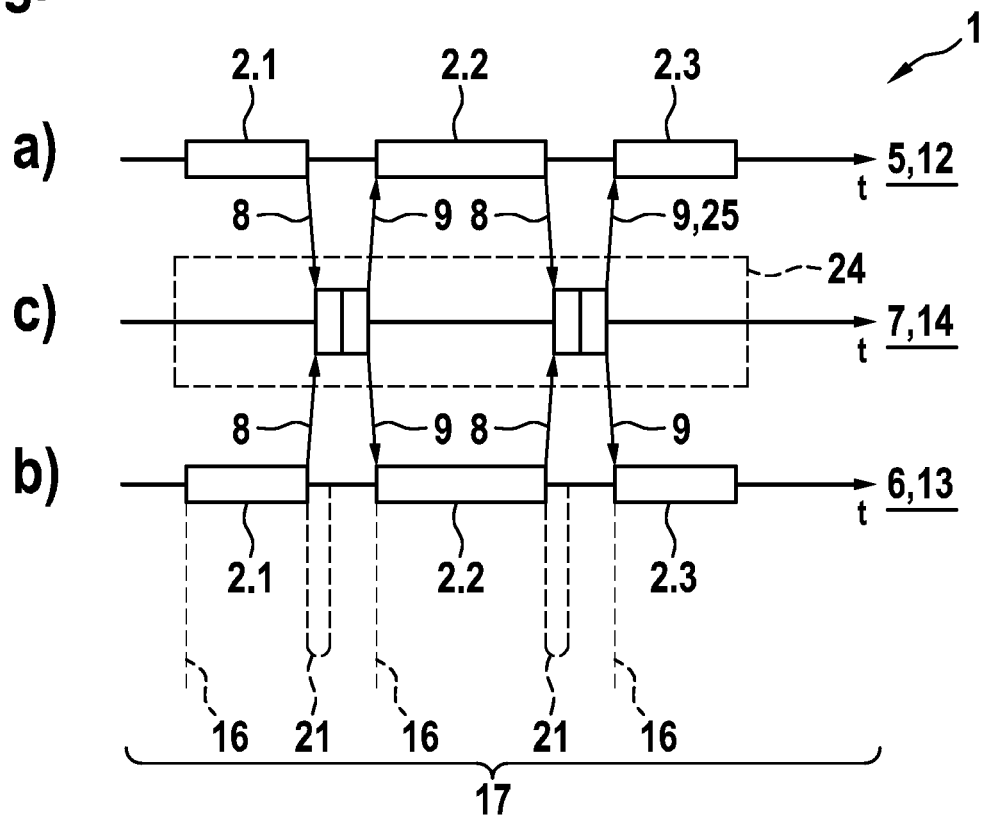
FIG. 2: a processing of the individual data processing steps on a logical timeline.

FIG. 2 selects a different representation of the described data processing network 1 in the first working mode. FIG. 2 shows three arrows, one beneath the other, that define the individual hardware components and at the same time reflect the individual method steps a), b) and c) of the described method. At the same time, the arrows provide a representation of the processes on the respective hardware components on a logical timeline 17. The top arrow is a first hardware component 12 on which first data processing modules 5 are implemented. The bottom arrow is a second hardware component 13 on which the second data processing modules 6 are implemented. The center arrow is a third hardware component 14 on which the comparator module 7 is realized. Data processing steps 2 of the data processing network 1 are performed in first data processing modules 5 and second data processing modules 6, respectively. Whenever a data processing step 2 is completed, a control parameter 8 is transmitted to the comparator module 7, which then detects, by way of a comparison of the control parameters 8, whether the data processing step 2 was performed correctly (i.e., without errors). The comparator module 7 then generates synchronized control parameters 9 that are used to initiate further data processing steps 2, which then further process output data of previous data processing steps 2 (not shown here). The comparator module 8 and associated components may also be understood as a central processing unit 24 of the described data processing network 1. The synchronized control parameters 9 may be understood as stimuli 25 for initiating further data processing steps 2.

Figure 3:
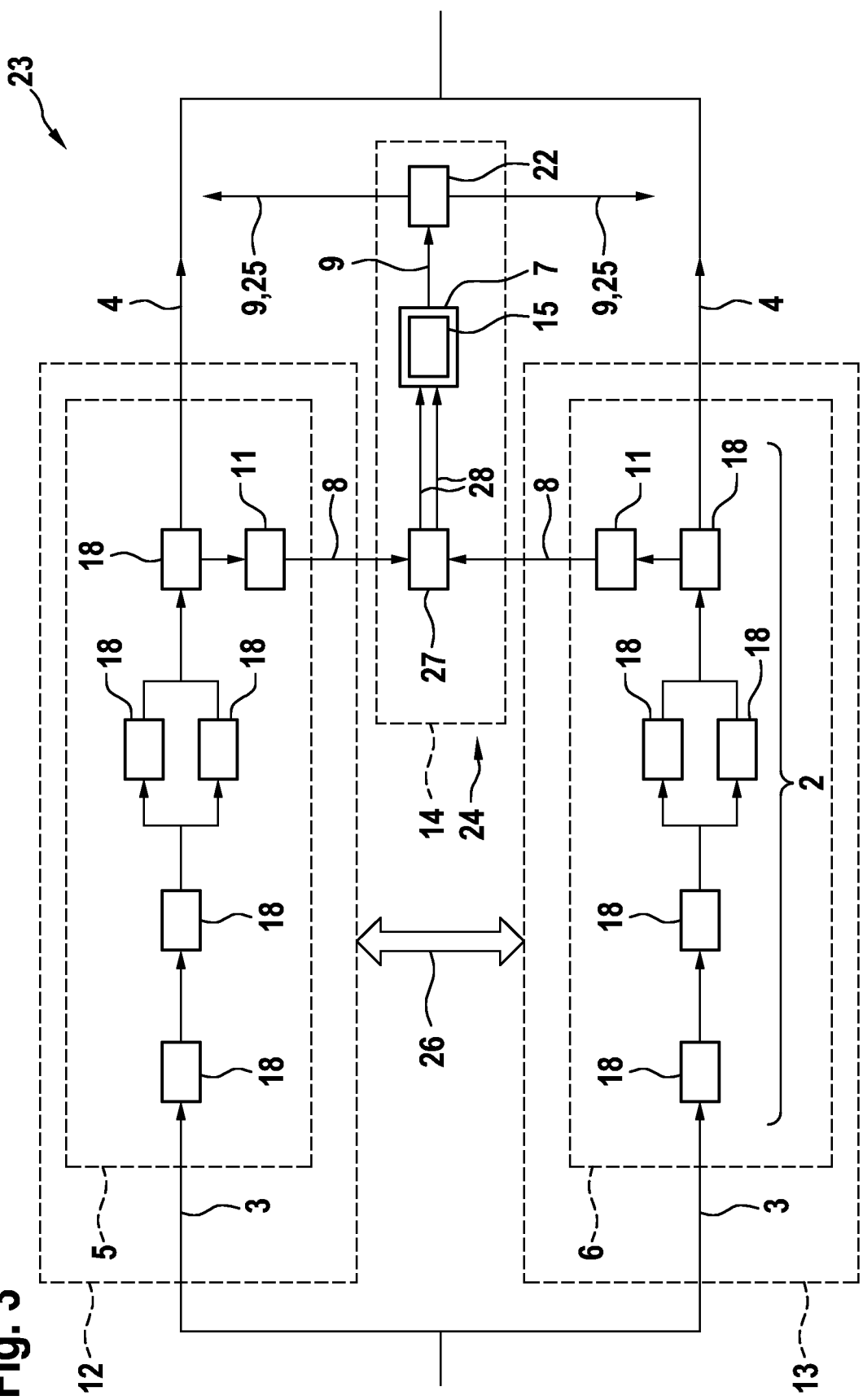
FIG. 3: the processing of a single data processing step using the various data processing modules.

In FIG. 3, parallel processing of a data processing step 2 according to the first working mode using a first data processing module 5 and a second data processing module 6 is shown in even more detail. It can be seen that the first data processing module 5 is realized on a first hardware component 12, while the second data processing module 6 is realized on a second hardware component 13. The first data processing module 5 and the second data processing module 6 each process the same input data 3 and are also each intended to generate the same output data 4.

A data processing step 2 or a data processing module 5, 6, respectively, can again be internally subdivided into a plurality of individual data processing components 18, each of which involves data processing sub-steps. Therefore, the data processing step 2 or the data processing module 5, 6 as defined here, involve pre-groupings of sub-steps that have already been sensibly determined on the basis of the application case, the pre-groupings being performed by the data processing components 18. Preferably, the pre-grouping of sub-steps is selected such that no data storage means is required within a data processing step 2 or data processing module 5, 6 and that, in particular, no data are accessed other than the input data for the execution.

The first data processing module 5 and the second data processing module 6 each generate control parameters 8, which are evaluated by the comparator module 7. The comparator module 7 is realized on a third hardware component 14 which is independent of the first hardware component 12 and the second hardware component 13, the third hardware component forming a central processing unit 24 and preferably providing the higher safety (higher ASIL level) of execution as already described above. In preferred design variants, a sequentialization module 11 for obtaining the control parameters 8 from the data processing and from the comparator module 7 is still placed upstream of each data processing module 5, 6, respectively, in this case a synchronizer 27. In addition, a task distribution module 22 may be placed downstream of the comparator module 7, the task distribution module outputting synchronized control parameters 9 and stimuli 25 for initiating further data processing steps 2. Synchronizer 27, comparator module 7 and task distribution module 22 may be realized together on the third hardware component 14 as the described central processing unit 24. Preferably, the described data processing network 1 operates in such a way that data processing steps 2 are performed on hardware that is available and underutilized. The task distribution module 22 may provide for this distribution of the data processing steps 2 to the available hardware. Moreover, execution of the performed data processing steps 2 takes different lengths of time on each hardware. Sorting of the incoming control parameters 8 is achieved by the synchronizer 27, so that the comparator module 7 then compares the correct control parameters 8, respectively, with each other even at a high utilization of the hardware in order to generate correct synchronized control parameters 9. For this purpose, the control parameters 8 are transferred from the synchronizer 27 to the comparator module 7 as control parameter tuples 28. It is not necessary for input data 3 and output data 4 to be transferred from one data processing step 2 to the next data processing step 2 via the central processing unit 24 and the comparator module 7, respectively. There may also be additional data transfer interfaces 26 between the data processing modules 5, 6 or the respective hardware components 12, 13, for this purpose that exist independently from the comparator module 7. Data provided via these data transfer interfaces 26 are preferably accessed when error-free processing by the data processing step 2 generating the respective output data 4 in both data processing modules 5, 6 has been determined using the comparator module 7.

Figure 4:
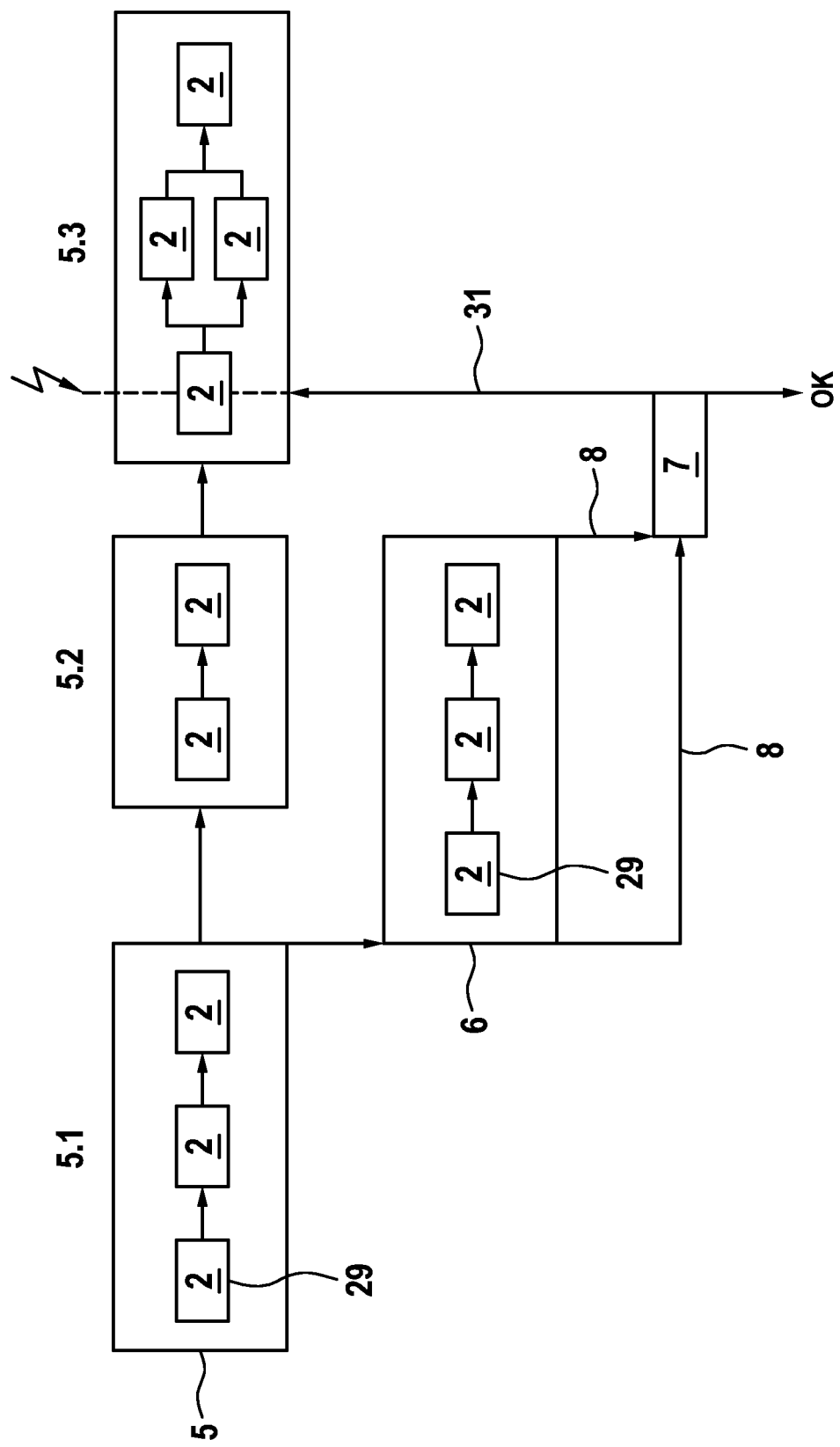
FIG. 4: a representation of the second working mode of the described data processing network.

Shown in FIG. 4 for a sequence 29 of three data processing steps 2 is how a second working mode may be selectively realized. It can be seen that the sequence of data processing steps is performed using the first data processing module 5. In 5.1, 5.2 and 5.3, several data processing modules 5 arranged one after the other along the data flow through the data processing network 1, each module comprising a plurality of data processing steps 2, respectively. It can be seen that the sequence 29 performed using the data processing module 5.1 is recalculated using the (downstream) second data processing module 6 and a comparison of the control parameters 8 is only performed thereafter using the comparator module 7. If the comparator module 7 determines that all is OK, the described data processing network will continue to run normally. If the comparator module 7 detects an error, which typically consists of a deviation between the control parameters 8, an error signal 31 is triggered.

In the first working mode, the next first data processing module 5.2 and 5.3 shown here may again operate in parallel operation with second data processing modules 6.2 and 6.3, not shown here. If the comparator module 7 determines that the calculation of sequence 29 was correct, everything will proceed as normal. If an error signal 31 occurs, such data processing steps 2 which are built upon the calculation of sequence 29, may be discarded.

Figure 5:
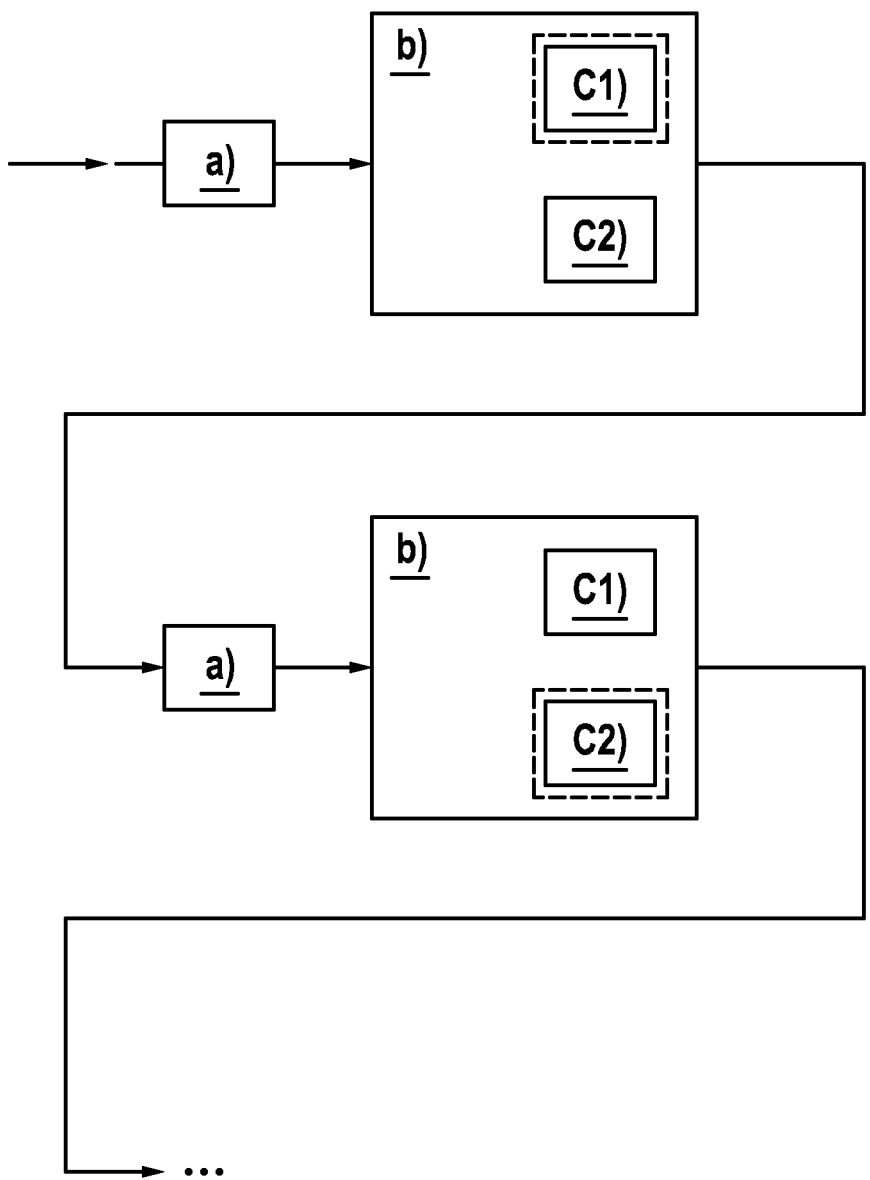
FIG. 5: a flow chart of the described method.

In FIG. 5, yet another representation of the described method is selected in which the method steps a), b) and c) are performed for each data processing step 2, respectively. The execution of the actual data processing steps 2 is always performed redundantly with respect to one another using the first data processing module 5 and using the second data processing module 6. Then, the comparator module 7 is used to check whether the data processing step 2 has been performed correctly before a next data processing step 2 is started.

The invention claimed is:

1. A data processing network for performing a plurality of successive data processing steps in a redundant and validated manner, said data processing steps each used to generate output data from input data, at least some of the output data from a first data processing step are at a same time the input data of a further data processing step, the data processing network comprising:
   at least one first data processing module and at least one second data processing module configured to perform each data processing step; and
   a comparator module,
   wherein the first data processing module and the second data processing module are configured to perform the data processing steps, selectively in a first working mode with parallel operation, or in a second working mode with an upstream data processing module and a downstream data processing module,
   wherein in the first working mode with parallel operation, control parameters of individual data processing steps are transmitted to the comparator module, and the comparator module is configured to perform at least one comparison of corresponding control parameters that were transmitted by the first data processing module and the second data processing module, and to provide at least one synchronized control parameter based on this comparison, the at least one synchronized control parameter containing control information regarding at least one performed data processing step, and wherein, in the second working mode which has the upstream data processing module, and the downstream data processing module, a sequence of successive data processing steps is performed in the upstream data processing module without transmitting the control parameters to the comparator module between the data processing steps and comparing them there for verification, and after performing the sequence of successive data processing steps, the control parameters are transmitted to the comparator module, causing a recalculation of the sequence of successive data processing steps in the downstream data processing module.

2. The data processing network according to claim 1, further comprising:
a scheduling recorder, which during operation according to the second working mode, is configured to record sequence data involving the sequence of successive data processing steps and to provide the sequence data to the downstream data processing module for recalculation of the sequence of successive data processing steps.

3. The data processing network according to claim 1, wherein the comparison of the control parameters involves an identity verification and the at least one synchronized control parameter requires an identity of the control parameters from the first data processing module and from the second data processing module.

4. The data processing network according to claim 1, wherein the network is configured to use synchronized control parameters provided by the comparator module to control a further data processing of the output data using further data processing steps of the data processing network.

5. The data processing network according to claim 1, wherein the at least one synchronized control parameter is a validity parameter which contains validity information regarding at least one performed data processing step.

6. The data processing network according to claim 1, further comprising:
at least one sequentialization module configured to sort and synchronize control parameters of the first and second data processing modules and/or to sort and synchronize each of the data processing steps and then forward them sorted to the comparator module, such that the comparator module can determine synchronized control parameters independent of an order in which the first and second data processing modules had executed the data processing steps.

7. The data processing network according to claim 6, wherein at least one of the first and second data processing modules comprises a hardware component that is not automotive safety integrity level-D (ASIL-D) compliant.

8. The data processing network according to claim 1, wherein:
the at least one first data processing module is realized with first hardware components and the at least one second data processing module is realized with second hardware components, and
the first hardware components and the second hardware components are physically separated from each other.

9. The data processing network according to claim 8, wherein the comparator module is realized with third hardware components that are physically separated from first hardware components and from second hardware components.

10. The data processing network according to claim 9, wherein the third hardware component is automotive safety integrity level-D (ASIL-D) compliant.

11. The data processing network according to claim 1, wherein the comparator module comprises a data storage device in which determined control parameters are stored together with time information so that a logical timeline is created that depicts an order of processing the data processing steps using the first and second data processing modules of the data processing network.

12. The data processing network according to claim 1, wherein a hardware component of the first and second data processing modules is significantly more powerful than a hardware component of the comparator module.

13. The data processing network according to claim 1, wherein the comparison of the control parameters comprises a check of whether an error that has occurred during data processing in the first data processing module and/or the second data processing module is below a tolerance limit, and if so the at least one synchronized control parameter is generated.

14. A method for operating a data processing network according to claim 1, comprising:
a) determining whether the sequence of successive data processing steps in the first working mode is to be operated with parallel operation of the first data processing module and the second data processing module, or with the second working mode using the upstream data processing module and the downstream data processing module,
b) operating the first data processing module and the second data processing module according to the first working mode or according to the second working mode to perform the data processing steps, wherein in the first working mode a following step c1) is performed after each data processing step, and wherein in the second working mode a following step c2) is performed after completion of the sequence of successive data processing steps:
c1) performing a comparison of respective control parameters transmitted by the first data processing module and the second data processing module using the comparator module, and, based on the comparison providing the at least one synchronized control parameter that contains control information regarding the at least one performed data processing step, or
c2) recalculating the sequence of successive data processing steps in the downstream data processing module based on the control parameters which were determined in calculation of the sequence of successive data processing steps in the upstream data processing module and performing a comparison of the calculations using the comparator module and providing the at least one synchronized control parameter based on this comparison, the at least one synchronized control parameter containing control information regarding at least one performed sequence of data processing steps.

* * * * *